US006424552B1

(12) United States Patent
Jacobson

(10) Patent No.: US 6,424,552 B1
(45) Date of Patent: Jul. 23, 2002

(54) MULTIPHASE TRANSFORMER HAVING MAIN AND AUXILIARY TRANSFORMERS

(75) Inventor: Boris Solomon Jacobson, Westford, MA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/760,921

(22) Filed: Jan. 16, 2001

(51) Int. Cl.$^7$ ................................................. H02M 5/06
(52) U.S. Cl. ......................................... 363/154; 363/64
(58) Field of Search ........................... 363/64, 148, 153, 363/154

(56) References Cited

U.S. PATENT DOCUMENTS

| | | | |
|---|---|---|---|
| 3,988,660 A | * 10/1976 | Ruch et al. | |
| 4,255,784 A | 3/1981 | Rosa | |
| 4,488,211 A | 12/1984 | Miyairi | |
| 4,532,581 A | 7/1985 | Miyairi | |
| 4,685,049 A | * 8/1987 | Neft | 363/159 |
| 4,779,181 A | 10/1988 | Traver et al. | |
| 5,006,783 A | * 4/1991 | Corel et al. | 323/263 |
| 5,063,487 A | * 11/1991 | Johnson et al. | 363/3 |
| 5,148,357 A | 9/1992 | Paice | |

\* cited by examiner

*Primary Examiner*—Adolf Deneke Berhane
(74) *Attorney, Agent, or Firm*—Daly, Crowley & Mofford LLP

(57) ABSTRACT

A multi-phase transformer system is provided having a main transformer fed by an N-phase voltage and a separate auxiliary transformer fed by the N-phase voltage. Windings in the main transformer are connected to secondary windings in the auxiliary transformer to provide pairs of connected windings. Each pair of connected windings has one of the windings of the main transformer and one of the secondary windings of the auxiliary transformer. The windings in such connected pair are arranged to produce voltages having different phases with each pair of windings producing an output voltage equal to the vector sum of the voltages produced by the such connected pair of windings. With such an arrangement, by having two separate transformers, i.e., the main transformer and the auxiliary transformer, fabrication of a multi-phase transformer system is simplified. Further, leakage inductance in the auxiliary transformer may be readily adjusted and increased to thereby suppress higher harmonic distortion without the need for an additional filter. In one embodiment, secondary windings of the main transformer are connected to the secondary windings of the auxiliary transformer. In such embodiment, each pair of connected windings includes one of the secondary windings of the main transformer and one of the secondary windings of the auxiliary transformer. In a second embodiment, the N-phase voltage is connected directly to the primary winding of the auxiliary transformer and indirectly to the primary windings of the main transformer through the secondary windings of the auxiliary transformer. In such embodiment, each pair of windings includes one of the secondary winding of the auxiliary transformer and one of the primary windings of the main transformer.

6 Claims, 5 Drawing Sheets

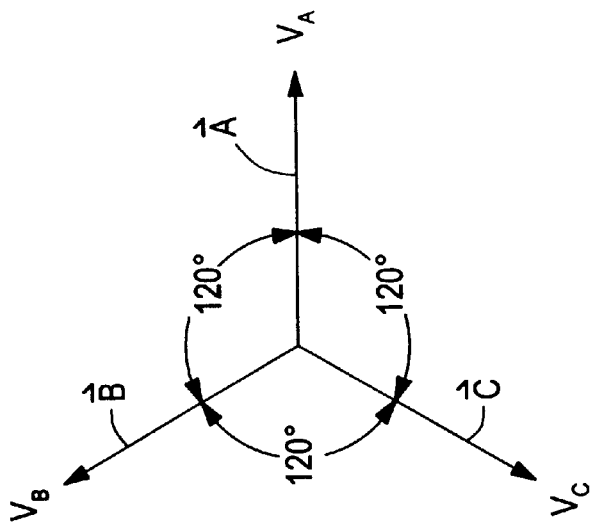

$V_{o1} = \vec{1C} + K_6\vec{1A}$    $V_{o4} = K_1\vec{1C} + K_7\vec{1A}$    $V_{o7} = K_2\vec{1C} + K_8\vec{1A}$ $V_{o2} = \vec{1A} + K_6\vec{1B}$    $V_{o5} = K_1\vec{1A} + K_7\vec{1B}$    $V_{o8} = K_2\vec{1A} + K_8\vec{1B}$ $V_{o3} = \vec{1B} + K_6\vec{1C}$    $V_{o6} = K_1\vec{1B} + K_7\vec{1C}$    $V_{o9} = K_2\vec{1B} + K_8\vec{1C}$ $V_{o10} = K_3\vec{1C} + K_9\vec{1A}$    $V_{o13} = K_4\vec{1C} + K_{10}\vec{1A}$    $V_{o16} = K_5\vec{1C} + K_{11}\vec{1A}$ $V_{o11} = K_3\vec{1A} + K_9\vec{1B}$    $V_{o14} = K_4\vec{1A} + K_{10}\vec{1B}$    $V_{o17} = K_5\vec{1A} + K_{11}\vec{1B}$ $V_{o12} = K_3\vec{1B} + K_9\vec{1C}$    $V_{o15} = K_4\vec{1B} + K_{10}\vec{1C}$    $V_{o18} = K_5\vec{1B} + K_{11}\vec{1C}$

PRIOR ART

*FIG. 1B*

MULTIPHASE TRANSFORMER HAVING MAIN AND AUXILIARY TRANSFORMERS

This invention relates generally to multi-phase transformer systems and more particularly to multi-phase power transformer systems having improved phasor balance and reduced total harmonic distortion (THD).

As is known in the art, many electrical systems require direct current power. Such direct current (DC) is typically produced by rectifying three-phase alternating current (AC) voltage. The rectifiers, however, induce harmonic distortion in the input line. Such effect is described in U.S. Pat. No. 4,779,181 entitled "Multiphase Low Harmonic Distortion Transformer", inventors Traver et al., issued Oct. 18, 1988. The total harmonic distortion (THD) generated by rectification can be improved by increasing the number of AC phases fed to the rectifiers. Some of these multi-phase transformer systems are described in the U.S. Pat. Nos.: 4,779,181, 4,255,784, 5,148,357, 4,532,581, and 4,488,211. The line harmonics for these systems are inversely proportional to the number of phases according to the following equation:

$$K_H = 2*m*(n+/-1),$$

where $K_H$ is the harmonic order m is the number of phases n = 0, 1, 2, ...

For example, the harmonics of a 12-phase system are: 23, 25, 47, 49, 71, 73.

A schematic diagram for a conventional 18-phase, single transformer is shown in FIGS. 1A and 1B. Thus, the transformer 10 has a three-phase primary winding 12 magnetically coupled to a secondary winding section 16 through a core 14. The secondary winding section 16 has a set of six main Y-configured, three-phase secondary windings 16a–16f. The voltage produced in the three secondary windings of set 16a are $\overline{A}$, $\overline{B}$ and $\overline{C}$ where $\overline{A}$, $\overline{B}$ and $\overline{C}$ have equal magnitudes and 120 degrees of relative phase shift with respect to each other. The voltages produced in the three secondary windings of set 16b are $K_1\overline{A}$, $K_1\overline{B}$ and $K_1\overline{C}$ where $K_1$ is a less than one. Thus, the number of turns in each of the three windings in set 16a are equal to each other and the number of turns set 16b are equal to each other the number of turns in the three sets of windings in set 16b are a fraction of the number of turns in the three windings in set 16a. Thus, the voltages $K_1\overline{A}$, $K_1\overline{B}$ and $K_1\overline{C}$ have equal magnitudes, here $1/K_1$ th the voltage in each of the windings set 16, and 120 degrees of relative phase shift with respect to each other. That is, the voltages $K_1\overline{A}$, $K_1\overline{B}$ and $K_1\overline{C}$ are in-phase with the voltages $\overline{A}$, $\overline{B}$, and $\overline{C}$ in set 16a. In like manner, the voltages in sets 16c through 16f are: $K_2\overline{A}$, $K_2\overline{B}$ and $K_2\overline{C}$; $K_3\overline{A}$, $K_3\overline{B}$ and $K_3\overline{C}$; $K_4\overline{A}$, $K_4\overline{B}$ and $K_4\overline{C}$; and $K_5\overline{A}$, $K_5\overline{B}$ and $K_5\overline{C}$, respectively, where $K_3=1$, $K_1=K_4$, $K_2=K_5$, $K_2<K_1$ and such relationship is determined by the relative number of turns in the windings.

The secondary section 16 also includes six sets 16g–16l of auxiliary windings magnetically coupled to the primary 12 though core 14. Each set has three windings. Each one of the windings in the set produces a voltage in-phase with a corresponding one of the three voltage $\overline{A}$, $\overline{B}$, and $\overline{C}$. The magnitudes of the voltages in sets 16g–16l are scaled relatively to the magnitudes of the voltages $\overline{A}$, $\overline{B}$, and $\overline{C}$ by factors of: $1/K_6$ through $1/K_{11}$, respectively. It is noted that the windings in sets 16a through 16f are connected to the windings in sets 16g through 16l selectively as shown to thereby produce voltages $V_{O1}$ through $V_{O18}$ which may be represented as: $\overline{C}+K_6\overline{A}$;

$\overline{A}+K_6\overline{B}$;

$\overline{B}+K_6\overline{C}$;

$K_1\overline{C}+K_7\overline{A}$;

$K_1\overline{A}+K_7\overline{B}$;

$K_1\overline{B}+K_7\overline{C}$;

$K_2\overline{C}+K_8\overline{A}$;

$K_2\overline{A}+K_8\overline{B}$;

$K_2\overline{B}+K_8\overline{C}$;

$K_3\overline{C}+K_9\overline{A}$;

$K_3\overline{A}+K_9\overline{B}$;

$K_3\overline{B}+K_9\overline{C}$;

$K_4\overline{C}+K_{10}\overline{A}$;

$K_4\overline{A}+K_{10}\overline{B}$;

$K_4\overline{B}+K_{10}\overline{C}$;

$K_5\overline{C}+K_{11}\overline{A}$;

$K_5\overline{A}+K_{11}\overline{B}$;

$K_5\overline{B}+K_{11}\overline{C}$, respectively.

These voltages VO1 through VO11 are fed to a rectification system, as shown. The rectified voltages are combined in combiner 20 to produce the here 18-phase combined output voltage, VOUT.

SUMMARY

In accordance with the present invention, a multi-phase transformer system is provided having a main transformer fed by an N-phase voltage and a separate auxiliary transformer fed by the N-phase voltage. Windings in the main transformer are connected to secondary windings in the auxiliary transformer to provide pairs of connected windings. Each pair of connected windings has one of the windings of the main transformer and one of the secondary windings of the auxiliary transformer. The windings in such connected pair are arranged to produce voltages having different phases with each pair of windings producing an output voltage equal to the vector sum of the voltages produced by the such connected pair of windings.

With such an arrangement, by having two separate transformers, i.e., the main transformer and the auxiliary transformer, fabrication of a multi-phase transformer system is simplified. Further, leakage inductance in the auxiliary transformer may be readily adjusted and increased to thereby suppress higher harmonic distortion without the need for an additional filter. The increased leakage inductance of the auxiliary transformer does not cause higher harmonic distortion in the low frequency part of the spectrum that occurs if the leakage inductance of the main transformer is increased.

In one embodiment, secondary windings of the main transformer are connected to the secondary windings of the auxiliary transformer. In such embodiment, each pair of connected windings includes one of the secondary windings of the main transformer and one of the secondary windings of the auxiliary transformer.

In a second embodiment, the N-phase voltage is connected directly to the primary winding of the auxiliary transformer and indirectly to the primary windings of the main transformer through the secondary windings of the auxiliary transformer. In such embodiment, each pair of windings includes one of the secondary windings of the auxiliary transformer and one of the primary windings of the main transformer.

In accordance with still another aspect of the invention, a multi-phase transformer system is provided having a main transformer and a separate auxiliary transformer. The main transformer includes a main secondary winding section magnetically coupled to a main primary winding section. One of the winding sections of the main transformer includes a plurality of M sets of main windings, where M is an integer greater than one. Each one of the M sets has a plurality of N main windings for producing N voltages having the same amplitudes and a predetermined phase relationship. The amplitudes of the voltages produced by one of the sets are different from the amplitude of the voltages produced by another one of the sets. The auxiliary transformer includes an auxiliary primary winding section having inputs connected to the main transformer. The auxiliary transformer includes a plurality of M auxiliary secondary winding sets magnetically coupled to an auxiliary primary winding section. Each one of the M sets of auxiliary secondary winding sets is connected to a corresponding one of the M sets of main windings. Each one of the auxiliary secondary windings in each one of the M sets thereof produces N voltages having the predetermined phase relationship. The amplitudes of the voltage produced in each one of the M sets of auxiliary secondary windings are equal. The amplitudes of the voltages produced in one of the M sets of auxiliary secondary windings are different from the amplitudes of the voltages produced in another one of the sets M sets of auxiliary secondary windings. Each one the windings in each one of the sets M sets of auxiliary secondary windings is connected to a corresponding one of the windings in the one of the M sets of main windings to form a pair of connected windings. The windings in the connected pair produce voltages having different amplitudes and phases. Each one of the connected pair of windings produces an output voltage equal to the vector sum of the voltages produced by the connected pair of windings.

In one embodiment, the M sets of main windings are secondary windings of the main transformer. In such embodiment, each pair of connected windings includes one of the secondary windings of the main transformer and one of the secondary windings of the auxiliary transformer.

In a second embodiment, the M sets of main windings are primary windings of the main transformer. In such embodiment, each pair of windings includes one of the secondary winding of the auxiliary transformer and one of the primary windings of the main transformer.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 1A and 1B is a schematic diagram of a multiphase transformer according to the PRIOR ART.

Like reference symbols in the various drawings indicate like elements.

DETAILED DESCRIPTION

Figure 1A:
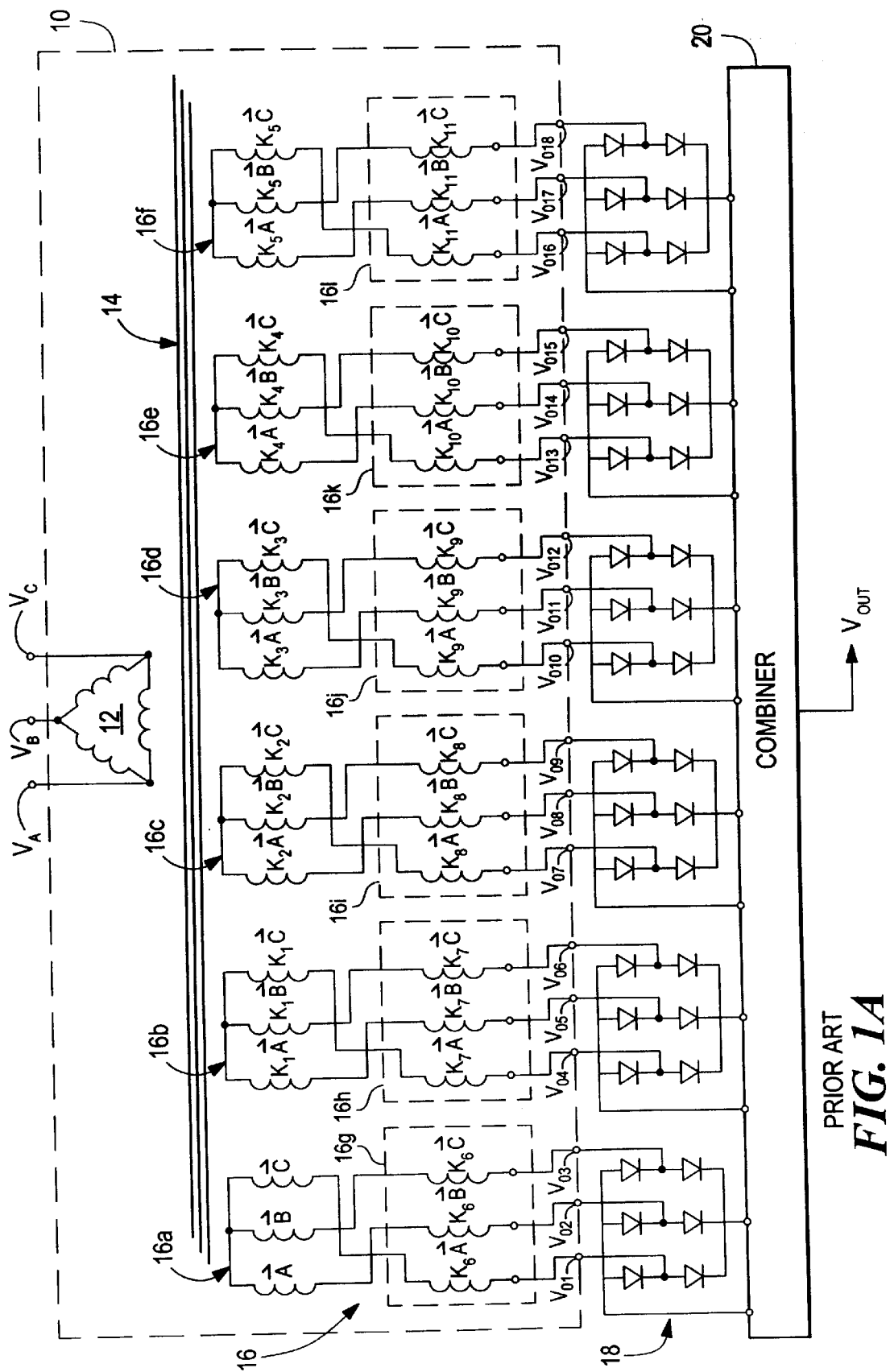
Figure 2:
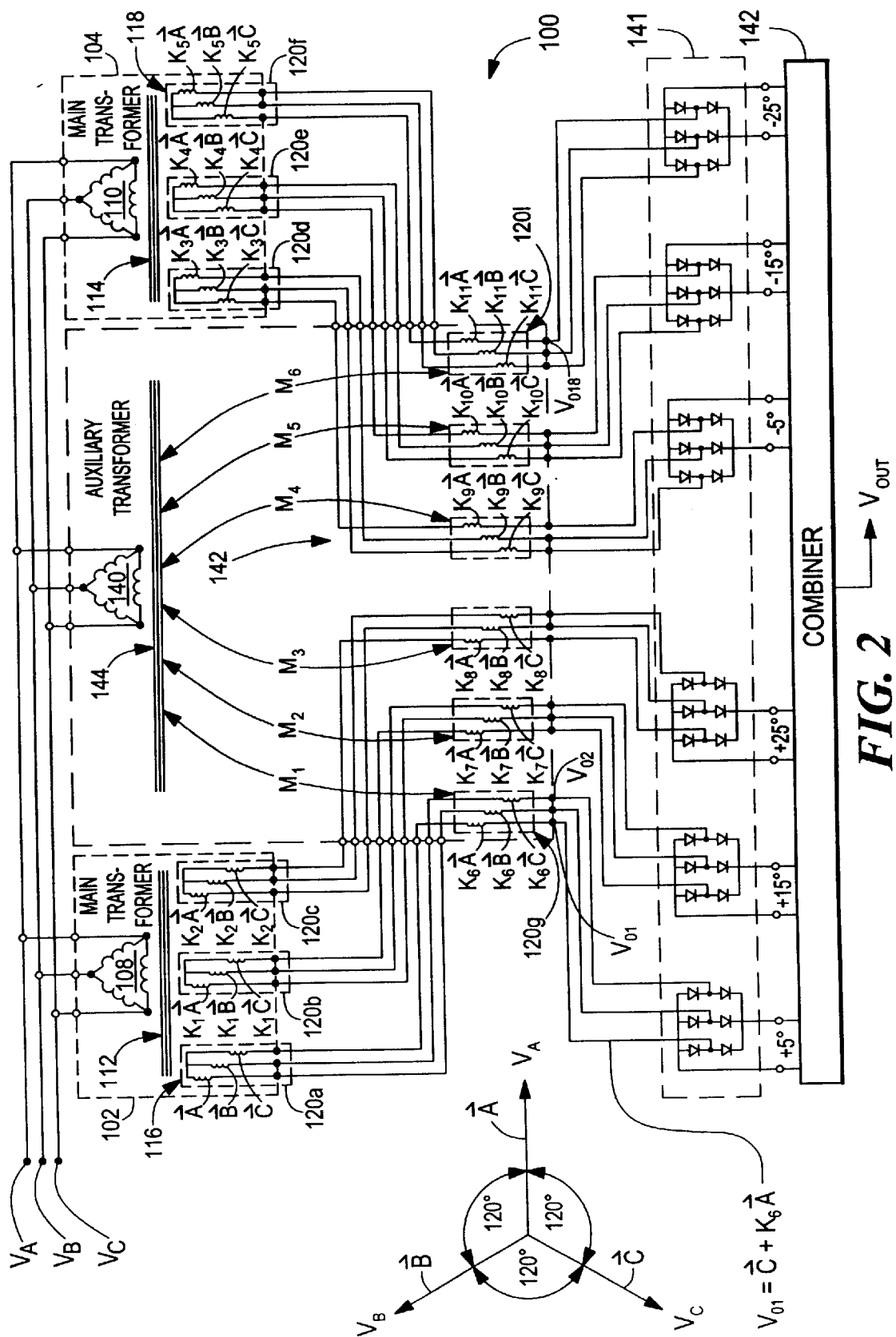
FIG. 2 is a schematic diagram of a multiphase transformer according to the invention.
Figure 4:
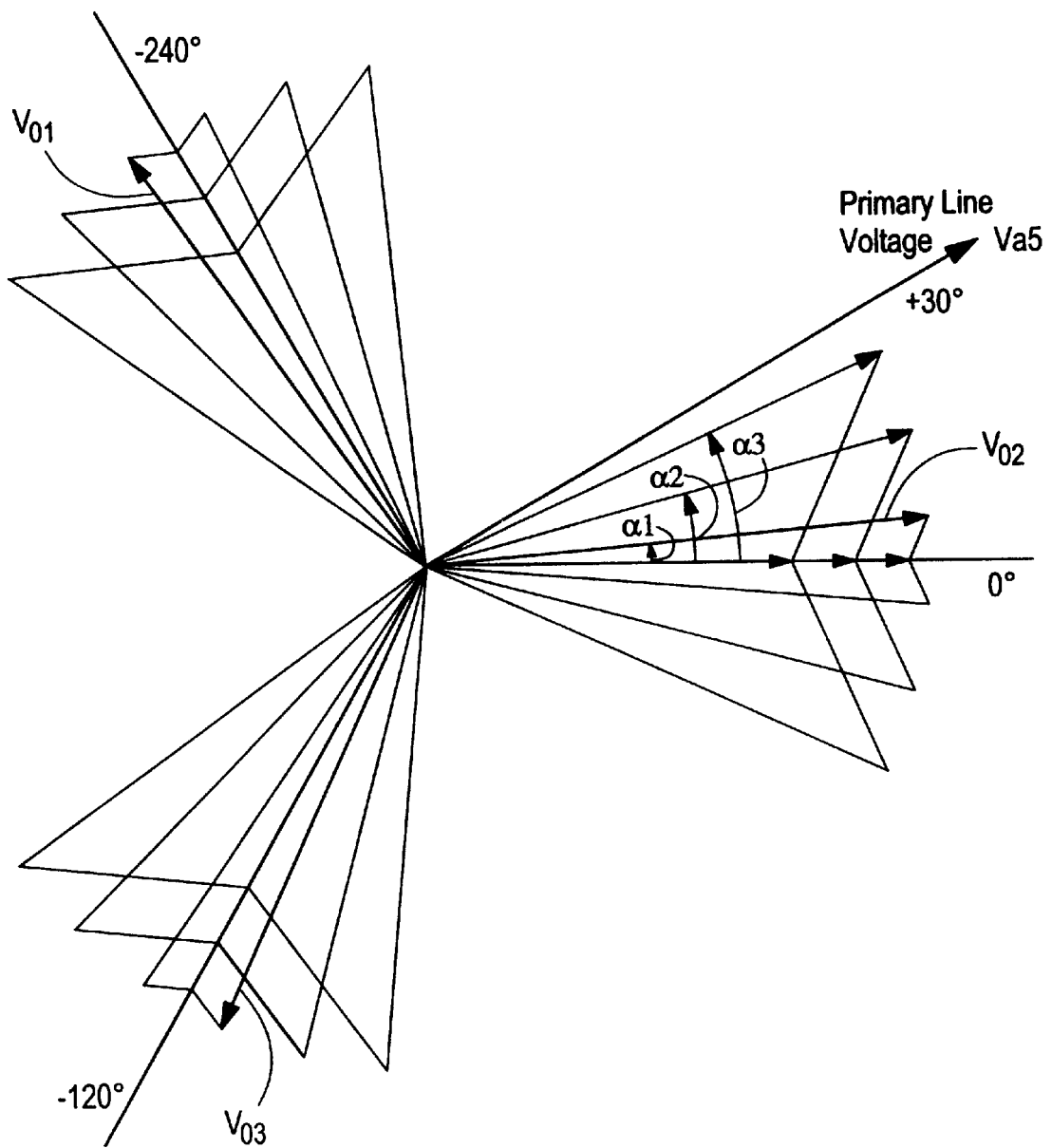
FIG. 4 is a phasor diagram for an 18-phase voltage.

Referring now to FIG. 2, a multi-phase transformer system 100 is provided here arranged to provide an eighteen-phase output voltage. The transformer system 100 includes a pair of main transformers 102, 104 and an auxiliary transformer 106. The pair of main transformers 102, 104 are identical in construction except as described below, and each includes a primary winding section 108, 110, respectively, here having three main primary windings arranged in a delta-configuration, as shown, and connected to the same, three-phase, AC voltages $V_A$, $V_B$ and $V_C$. Each one of the main transformers includes a magnetic core 112, 114, respectively, having a secondary winding section 116, 118 magnetically coupled to the primary winding sections 108, 110, respectively, through the cores 112, 114, respectively, as shown. The main secondary winding sections 116, 118 each has a plurality of M sets of main secondary windings 120a, 120b, 120c for main transformer 102; and sets 120d, 120e, 120f for main transformer 104, respectively, as shown, where M is an integer greater than one. Here, M is three. Each one of the M sets 120a, 120b, 120c of main transformer 102 has a plurality of N main secondary windings, where here N is three. The windings in each set produces N voltages having the same amplitudes and a predetermined phase relationship, here 360 degrees/N or 120 degrees. The amplitudes of the voltages produced by one of the sets are different from the amplitudes of the voltages produced by another one of the sets. Thus, considering one of the two main transformers 102, 104 here main transformer 102, the voltages produced by set 120a are $\overline{A}$, $\overline{B}$ and $\overline{C}$ where $\overline{A}$, $\overline{B}$ and $\overline{C}$ have equal magnitudes and 120 degrees of relative phase shift with respect to each other. The voltages produced in the three secondary windings of set 120b are $K_1\overline{A}$, $K_1\overline{B}$ and $K_1\overline{C}$ where $K_1$ is a less than one. Thus, the number of turns in each of the three windings in set 102a are equal to each other and the number of turns set 102b are equal to each other the number of turns in the three sets of windings in set 102b are a fraction of the number of turns in the three windings in set 102a. Thus, the voltages $K_1\overline{A}$, $K_1\overline{B}$ and $K_1\overline{C}$ in set 102b have equal magnitudes, here $1/K_1$ th the voltage in each of the windings in set 102a, and 120 degrees of relative phase shift with respect to each other. That is, the voltages $K_1\overline{A}$, $K_1\overline{B}$ and $K_1\overline{C}$ are in-phase with the voltages $\overline{A}$, $\overline{B}$, and $\overline{C}$ in set 102a. In like manner, the voltages in set 102c are: $K_2\overline{A}$, $K_2\overline{B}$ and $K_2\overline{C}$. Considering the second main transformer 104, the voltages in the first set 120d of secondary windings are: $K_3\overline{A}$, $K_3\overline{B}$ and $K_3\overline{C}$. In like manner, the voltages in the second set 102e of secondary windings are $K_4\overline{A}$, $K_4\overline{B}$ and $K_4\overline{C}$ and the voltages in the third set 102f of windings are: $K_5\overline{A}$, $K_5\overline{B}$ and $K_5\overline{C}$ where angles $\alpha1-\alpha4$ are as shown in FIG. 4, and coefficients $K_1-K_5$ are given by expressions below:

$$k_1 = \frac{\cos\alpha_2 * \left(1 - \frac{\tan\alpha_2}{\tan 60°}\right)}{\cos\alpha_1 * \left(1 - \frac{\tan\alpha_1}{\tan 60°}\right)}$$

$$k_2 = \frac{\cos\alpha_3 * \left(1 - \frac{\tan\alpha_3}{\tan 60°}\right)}{\cos\alpha_2 * \left(1 - \frac{\tan\alpha_2}{\tan 60°}\right)}$$

$$K_3 = 1, \quad K_4 = K_1, \quad K_5 = K_2, \text{ and } K_1 > K_2.$$

The auxiliary transformer 106 has an auxiliary primary winding section 140. The auxiliary primary winding section 140 has three primary windings here arranged in a delta-configuration, as shown, connected to the AC voltage $V_A$, $V_B$, and $V_C$, which is fed to the primary windings 108, 110 of the main transformers 102, 104. The auxiliary transformer 106 has a secondary winding section 142 magnetically coupled to the primary winding section 140 through core 144. The secondary winding section 142 includes a plurality of M auxiliary winding sets, 120g through 120l, magnetically coupled to the auxiliary primary winding section 140 through core 144 of the auxiliary transformer 106. Each one of such M sets 120g through 120l, is connected to a corresponding one of the M sets 120a through 120f, of main secondary windings, respectively, as shown. Each one of the auxiliary windings in each one of the M sets 120g through 120l thereof produces N voltages having the predetermined phase relationship, here the 120 degree phase relationship. The amplitudes of the voltage produced in each one of the sets 16'g through 16'l thereof are equal to each other. The amplitudes of the voltages produced in one of the sets 120'g through 120'l are different from the amplitudes of the voltages produced in another one of the sets 120'g through 120'l thereof. Thus, the voltages produced in set 120g are: $K_6\overline{A}$; $K_6\overline{B}$; and $K_6\overline{C}$, where $K_6$ is an integer less than $K_5$. In like manner, the voltages produced in set 120h through 120l are: $K_7\overline{A}$, $K_7\overline{B}$, and $K_7\overline{C}$; $K_8\overline{A}$, $K_8\overline{B}$, and $K_8\overline{C}$; $K_9\overline{A}$, $K_9\overline{B}$, and $K_9\overline{C}$; $K_{10}\overline{A}$, $K_{10}\overline{B}$, and $K_{10}\overline{C}$; and, $K_{11}\overline{A}$, $K_{11}\overline{B}$, and $K_{11}\overline{C}$, respectively. Coefficients $K_6$–$K_{11}$ are given by expressions below:

$$k_6 = \frac{\tan\alpha_1}{\sin 60° * \left(1 - \frac{\tan\alpha_1}{\tan 60°}\right)}$$

$$k_7 = \frac{\tan\alpha_2}{\sin 60° * \left(1 - \frac{\tan\alpha_2}{\tan 60°}\right)}$$

$$k_8 = \frac{\tan\alpha_3}{\sin 60° * \left(1 - \frac{\tan\alpha_3}{\tan 60°}\right)}$$

$K_9 = K_6$,
$K_{10} = K_7$
$K_{11} = K_8$

Each one of the windings in each one of the sets 120g through 120l is connected to a corresponding one of the windings in the one of the sets 120a through 120f of two main secondary windings corresponding thereto to form a pair of connected windings. Thus windings in the connected pair produce voltages that have different amplitudes and phases. The auxiliary secondary winding in such connected pair produce an output voltage equal to the vector sum of the voltages produced by the main secondary windings and the auxiliary secondary winding in such connected pair of windings.

More particularly, the voltage produced by the auxiliary secondary windings in sets 120g through 120l i.e., the output voltages $V_{O1}$ through $V_{O18}$, as indicated, such output voltages being represented as:

$\overline{C} + K_6\overline{A}$;
$\overline{A} + K_6\overline{B}$;
$\overline{B} + K_6\overline{C}$;
$K_1\overline{C} + K_7\overline{A}$;
$K_1\overline{A} + K_7\overline{B}$;
$K_1\overline{B} + K_7\overline{C}$;
$K_2\overline{C} + K_8\overline{A}$;
$K_2\overline{A} + K_8\overline{B}$;
$K_2\overline{B} + K_8\overline{C}$;
$K_3\overline{C} + K_9\overline{B}$;
$K_3\overline{A} + K_9\overline{C}$;
$K_3\overline{B} + K_9\overline{A}$;
$K_4\overline{C} + K_{10}\overline{B}$;
$K_4\overline{A} + K_{10}\overline{C}$;
$K_4\overline{B} + K_{10}\overline{A}$;
$K_5\overline{C} + K_{11}\overline{B}$;
$K_5\overline{A} + K_{11}\overline{C}$;
$K_5\overline{B} + K_{11}\overline{A}$; respectively.

Here, in this example, there are 45 turns on the secondary windings 120a of each one of the windings thereof. Likewise, there are 45 turns on the secondary windings 120d of each one of the windings thereof. Further, here $K_1 = 39/45$; $K_2 = 32/45$; $K_3 = 1$; $K_4 = K_1$; $K_5 = K_2$; $K_6 = -5/45$; $K_7 = -14/45$; $K_8 = -23/45$; $K_9 = K_6$; $K_{10} = K_7$; and, $K_{11} = K_8$; where the negative sign (−) indicates an opposite sense in the direction of the winding.

These voltages $V_{O1}$ through $V_{O18}$ are fed to a rectification system 140, as shown. The rectified voltages are combined in combiner 142 to produce the here 18-phase combined output voltage, VOUT.

It is noted that the leakage inductance in the secondary winding section of the auxiliary transformer may be increased compared with the leakage inductance of the secondary windings sections of the two main transformers by, here for example, increasing the separation between the secondary windings in the auxiliary transformers from the primary windings thereof compared to the separations in the two main transformers Thus, with the multi-phase transformer described above in connection with FIG. 2, the construction, cooling, and internal connections of such transformer are greatly simplified because all transformers are three-phase units and their phase-to-phase connections are external. Conventional off the shelf transformers may be used if the form factor and cooling requirements are satisfied. Further, because the power transfer and phase-shifting functions are separated among the main and auxiliary transformers, the transformer leakage inductances of both the main and auxiliary transformers can be independently adjusted to compensate for voltage imbalance caused by the non-ideal turns ratio. Finally, the leakage inductance of either the auxiliary or main transformers can be increased to perform the function of an external reactor. It can be done without affecting resultant secondary voltages at the rectifier inputs because neither unit has leg-to-leg cross coupling of leakage flux. For example, the phase-shifting transformer leakage inductance can be made arbitrarily large while the main transformers would remain tightly coupled. As indicated above, leakage inductance can be adjusted to balance the resultant secondary voltages. Because the auxiliary transformer provides line reactance to the rectifiers, its coupling factor is low (Ka= 0.999). As noted above, it is possible to adjust the leakage inductances of each phase thereby correcting the phasor imbalance caused by the transformer turns ratios.

Figure 3:
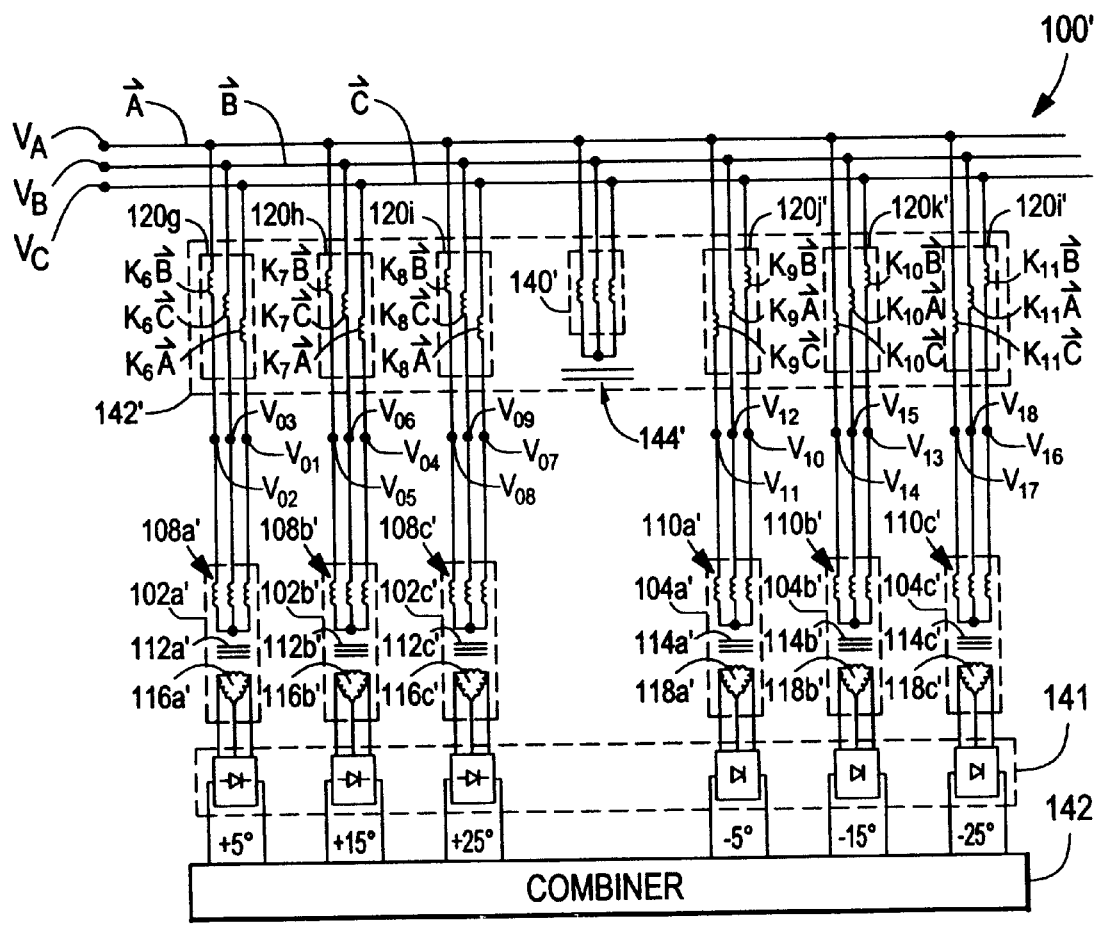
FIG. 3 is a schematic diagram of a multiphase transformer according to another embodiment of the invention.

Referring now to FIG. 3, a multi-phase transformer system 100' is provided here arranged to provide an eighteen-phase output voltage. The transformer system 100' includes six main transformers 102a', 102b', 102c', 104a', 104b' and 104c' and an auxiliary transformer 106'. The main transformers 102a', 102b', 102c', 104a', 104b' and 104c' are identical in construction except as described below, and each includes a primary winding section 108a'. 108b', 108c', 110a', 110b; and 110c; respectively as indicated, each one being and connected to the same, three-phase, AC voltages $V_A$, $V_B$ and $V_C$ through secondary windings of the auxiliary transformer 106', as shown. Each one of the main transformers includes a magnetic core 112a', 112b', 112c; 114a', 114b' and 114c; respectively, each having a delta configured secondary winding set 116a', 116b', 116c; 118a', 118b', 118c; respectively, as indicated magnetically coupled to the primary winding set 108a', 108b', 108c', 110a', 110b; and 110c; respectively as indicated, respectively, through the cores 112a', 112b', 112c; 114a', 114b', 114c; respectively, as shown. Each one of the secondary winding sets 116a', 116b', 116c; 118a', 118b', 118c has a plurality of M main secondary windings, where M is an integer greater than one. Here, M is three. Each one of the primary winding sets 108a', 108b', 108c', 110a', 110b; and 110c has a plurality of N main primary windings, where here N is three. The windings in each set produce N voltages having the same amplitudes and a predetermined phase relationship, here 120 degrees. The amplitudes of the voltages produced by one of the sets are different from the amplitudes of the voltages produced by another one of the sets. Thus, considering one of the six main transformers 102a', 102b', 102c', 104a', 104b' and 104c' here main transformer 102a', the voltages produced by set 108a' are $\overline{A}$, $\overline{B}$ and $\overline{C}$ where $\overline{A}$, $\overline{B}$ and $\overline{C}$ have equal magnitudes and 120 degrees of relative phase shift with respect to each other. The voltages produced in the three primary windings of set 108b' are $K_1\overline{A}$, $K_1\overline{B}$ and $K_1\overline{C}$ where $K_1$ is a less than one. Thus, the number of turns in each of the three windings in set 108a' is equal to each other. The number of turns in set 108b' is equal to each other. The number of turns in the three windings in set 108b' is a fraction of the number of turns in the three windings in set 108a'. Thus, the voltages $K_1\overline{A}$, $K_1\overline{B}$ and $K_1\overline{C}$ in set 108b' have equal magnitudes, here $1/K_1$ th the voltage in each of the windings in set 108a', and 120 degrees of relative phase shift with respect to each other. That is, the voltages $K_1\overline{A}$, $K_1\overline{B}$ and $K_1\overline{C}$ are in-phase with the voltages $\overline{A}$, $\overline{B}$ and $\overline{C}$ in set 108a. In like manner, the voltages in set 108c' are: $K_2\overline{A}$, $K_2\overline{B}$ and $K_2\overline{C}$. Considering the fourth main transformer 104a', the primary voltages in the set 110a' are $K_3\overline{A}$, $K_3\overline{B}$ and $K_3\overline{C}$. In like manner, the voltages in the fifth set 110b' are $K_4\overline{A}$, $K_4\overline{B}$ and $K_4\overline{C}$ and the voltages in the sixth set 110c' of windings are: $K_5\overline{A}$, $K_5\overline{B}$ and $K_5\overline{C}$ where $K_3=1$, $K_1=K_4$, $K_2=K_5$, $K_2<K_1$ and such relationship is determined by the relative number of turns in the windings.

The auxiliary transformer 106 has an auxiliary primary winding section 140. The auxiliary primary winding section 140 has three primary windings here arranged in a star-configuration, as shown, connected to the AC voltage $V_A$, $V_B$, and $V_C$. The auxiliary transformer 106 has a secondary winding section 142 magnetically coupled to the primary winding section 140 through core 144. The secondary winding section 142 includes a plurality of M auxiliary winding sets, 120g through 120l, magnetically coupled to the auxiliary primary winding section 140 through core 144 of the auxiliary transformer 106. Each one of such M sets 120g' through 120l', is connected to a corresponding one of the M sets 108a', 108b' 108c', 110a', 110b', 110c', of main primary windings, respectively, as shown. Each one of the auxiliary windings in each one of the M sets 120g through 120l thereof produces N voltages having the predetermined phase relationship, here the 120 degree phase relationship. The amplitudes of the voltage produced in each one of the sets 120g' through 120l' thereof are equal to each other. The amplitudes of the voltages produced in one of the sets 120g' through 120l' are different from the amplitudes of the voltages produced in another one of the sets 120g' through 120l' thereof. Thus, the voltages produced in set 120g' are: $K_6\overline{A}$; $K_6\overline{B}$; and $K_6\overline{C}$, where $K_6$ is an integer less than $K_5$. In like manner, the voltages produced in set 120h' through 120l' are: $K_7\overline{A}$, $K_7\overline{B}$, and $K_7\overline{C}$; $K_8\overline{A}$, $K_8\overline{B}$, and $K_8\overline{C}$; $K_9\overline{A}$, $K_9\overline{B}$, and $K_9\overline{C}$; $K_{10}\overline{A}$, $K_{10}\overline{B}$, and $K_{10}\overline{C}$; and, $K_{11}\overline{A}$, $K_{11}\overline{B}$, and $K_{11}\overline{C}$, respectively.

Each one of the windings in each one of the sets 120g' through 120l' is connected to a corresponding one of the windings in the one of the sets 108a', 108b', 108c', 110a', 110b', 110c' of six main secondary winding sets corresponding thereto to form a pair of connected windings. Thus, windings in the connected pair producing voltages have different amplitudes and phases. The resultant output voltage equals to the vector sum of the voltages produced by the main primary winding and the auxiliary secondary winding in such connected pair of windings.

More particularly, the voltage produced by the auxiliary secondary windings in sets 120g' through 120'l i.e., the output voltages $V_{O1}$ through $V_{O18}$, as indicated, such output voltages being represented as:

$\overline{C}+K_6\overline{A}$;
$\overline{A}+K_6\overline{B}$;
$\overline{B}+K_6\overline{C}$;
$K_1\overline{C}+K_7\overline{A}$;
$K_1\overline{A}+K_7\overline{B}$;
$K_1\overline{B}+K_7\overline{C}$;
$K_2\overline{C}+K_8\overline{A}$;
$K_2\overline{A}+K_8\overline{B}$;
$K_2\overline{B}+K_8\overline{C}$;
$K_3\overline{C}+K_9\overline{B}$;
$K_3\overline{A}+K_9\overline{C}$;
$K_3\overline{B}+K_9\overline{A}$;
$K_4\overline{C}+K_{10}\overline{B}$;
$K_4\overline{A}+K_{10}\overline{C}$;
$K_4\overline{B}+K_{10}\overline{A}$;
$K_5\overline{C}+K_{11}\overline{B}$;
$K_5\overline{A}+K_{11}\overline{C}$;
$K_5\overline{B}+K_{11}\overline{A}$; respectively.

A number of embodiments of the invention have been described. Nevertheless, it will be understood that various modifications may be made without departing from the spirit and scope of the invention. Accordingly, other embodiments are within the scope of the following claims.

What is claimed is:

1. A multi-phase transformer system, comprising:
   a main transformer fed by an N-phase voltage;
   an auxiliary transformer fed by the N-phase voltage;
   wherein windings in the main transformer are connected to secondary windings in the auxiliary transformer to provide pairs of connected windings, each pair of connected windings having one of the windings of the main transformer and one of the secondary windings of the auxiliary transformer, the windings in such connected pair being arranged to produce voltages having different phases with each pair of windings producing an output voltage equal to the vector sum of the voltages produced by the such connected pair of windings; and
   wherein the N-phase voltage is connected to: (a) the primary winding of the auxiliary transformer; (b) the primary windings of the main transformer through the secondary windings of the auxiliary transformer, each pair of windings including one of the secondary winding of the auxiliary transformer and one of the primary windings of the main transformer.

2. A multi-phase transformer system, comprising:
   a main transformer, comprising:
      a main secondary winding section;
      a main primary winding section magnetically coupled to the main secondary winging section;

wherein the main primary winding section includes a plurality of M sets of main windings, where M is an integer greater than one, each one of the M sets having a plurality of N main windings for producing N voltages having the same amplitudes and a predetermined phase relationship, the amplitudes of the voltages produced by one of the sets being different from the amplitude of the voltages produced by another one of the sets;

an auxiliary transformer, comprising:

an auxiliary primary winding section connected to inputs of the main transformer section;

a plurality of M auxiliary secondary winding sets magnetically coupled to an auxiliary primary winding section;

wherein each one of the M sets of auxiliary secondary winding sets is connected to a corresponding one of the M sets of main windings, each one of the auxiliary secondary windings in each one of the M sets thereof being arranged to produce N voltages having the predetermined phase relationship with the amplitudes of the voltage produced in each one of the M sets of auxiliary secondary windings are equal and with the amplitudes of the voltages produced in one of the M sets of auxiliary secondary windings being different from the amplitudes of the voltages produced in another one of the sets M sets of auxiliary secondary windings;

wherein each one the windings in each one of the sets M sets of auxiliary secondary windings is connected to a corresponding one of the windings in the one of the M sets of main windings to form a pair of connected windings, the windings in the connected pair produce voltages having different amplitudes and phases, each one of the connected pair of windings producing an output voltage equal to the vector sum of the voltages produced by the connected pair of windings;

wherein the N-phase voltage is connected to (a) the primary winding of the auxiliary transformer; and, (b) to the primary windings of the main transformer through the secondary windings of the auxiliary transformer, and wherein each pair of windings includes one of the secondary winding of the auxiliary transformer and one of the primary windings of the main transformer.

3. A multi-phase transformer system, comprising:

(a) main transformer, comprising:

(i) a main primary winding section;

(ii) a main secondary winding section magnetically coupled to the main primary winding section;

(iii) wherein the main primary winding section includes:

(A) a plurality of M sets of windings, where M is an integer greater than one, each one of the M sets having a plurality of N main windings producing N voltages having the same amplitudes and a predetermined phase relationship with the amplitudes of the voltages produced by one of the sets being different from the amplitude of the voltages produced by another one of the sets;

(b) an auxiliary transformer, comprising:

(i) an auxiliary primary winding section having inputs connected to inputs of the main transformer section;

(ii) a plurality of M auxiliary winding sets magnetically coupled to the auxiliary primary winding section;

(iii) wherein each one of the M sets of auxiliary windings is connected to a corresponding one of the M sets of main windings;

(iv) wherein each one of the auxiliary windings in each one of the M sets thereof produces N voltages having the predetermined phase relationship, the amplitudes of the voltage produced in each one of the sets thereof being equal;

(v) wherein the amplitudes of the voltages produced in one of the M sets of auxiliary secondary windings are different from the amplitudes of the voltages produced in another one of the sets thereof;

(c) wherein each one the windings in each one of the M sets of auxiliary secondary windings is connected to a corresponding one of the windings in the one of the sets of main secondary windings to form a pair of connected windings;

(d) wherein the windings in the connected pair of windings produce voltages having different amplitudes and phases, each one of the connected pair of windings being arranged to produce an output voltage equal to the vector sum of the voltages produced by the connected pair of windings; and (e) wherein the M sets of main windings are primary windings of the main transformer each pair of windings including one of the secondary winding of the auxiliary transformer and one of the primary windings of the main transformer.

4. A multi-phase transformer system, comprising:

a main transformer fed by an N-phase voltage;

an auxiliary transformer fed by the N-phase voltage;

wherein windings in the main transformer are connected to secondary windings in the auxiliary transformer to provide pairs of connected windings, each pair of connected windings having one of the windings of the main transformer and one of the secondary windings of the auxiliary transformer, the windings in such connected pair being arranged to produce voltages having different phases with each pair of windings producing an output voltage equal to the vector sum of the voltages produced by the such connected pair of windings; and wherein the leakage inductance of the main transformer is different from the leakage inductance of the auxiliary transformer.

5. The system recited in claim 4 wherein the leakage inductance of the auxiliary transformer is larger than the leakage inductance of the main transformer.

6. A multi-phase transformer system, comprising:

a main transformer fed by an N-phase voltage;

an auxiliary transformer fed by the N-phase voltage;

wherein windings in the main transformer are connected to secondary windings in the auxiliary transformer to provide pairs of connected windings, each pair of connected windings having one of the windings of the main transformer and one of the secondary windings of the auxiliary transformer, the windings in such connected pair being arranged to produce voltages having different phases with each pair of windings producing an output voltage equal to the vector sum of the voltages produced by the such connected pair of windings wherein the auxiliary transformer has a plurality of legs, each leg has a primary winding and at least one secondary winding, and wherein the leakage inductance in one of the legs is different from the leakage inductance in another one of the legs.

* * * * *

UNITED STATES PATENT AND TRADEMARK OFFICE
CERTIFICATE OF CORRECTION

PATENT NO. : 6,424,552 B1
DATED : July 23, 2002
INVENTOR(S) : Boris Solomon Jacobson It is certified that error appears in the above-identified patent and that said Letters Patent is hereby corrected as shown below:

<u>Title page, Item [54] and Column 1, line 1,</u>
Delete "MULTIPHASE" and replace with -- MULTI-PHASE --.

<u>Title page,</u>
Item [57], ABSTRACT,
Line 29, delete "winding" and replace with -- windings --.

<u>Column 1,</u>
Line 29, delete "73." and replace with -- 73.... --.
Line 41, delete "is a less than" and replace with -- is less than --.
Line 43, delete "turns set" and replace with -- turns in set --.
Line 43, delete "other the" and replace with -- other and the --.
Line 58, delete "though" and replace with -- through --.
Line 60, delete "voltage" and replace with -- voltages --.

<u>Column 2,</u>
Line 21, delete "V01" and replace with -- $V_{01}$ --.
Line 21, delete "V011" and replace with -- $V_{011}$ --.
Line 24, delete "VOUT" and replace with -- $V_{OUT}$ --.
Line 59, delete "winding" and replace with -- windings --.

<u>Column 3,</u>
Lines 25 and 27, delete "sets M sets" and replace with -- M sets --.
Line 43, delete "winding" and replace with -- windings --.
Line 53, delete "1B is" and replace with -- 1B are --.
Lines 53, 55 and 57, delete "multiphase" and replace with -- multi-phase --.

<u>Column 4,</u>
Line 50, delete "$k_1$" and replace with -- $K_1$ --.
Line 55, delete "$k_2$" and replace with -- $K_2$ --.

<u>Column 5,</u>
Line 25, delete "$k_6$" and replace with -- $K_6$ --.
Line 30, delete "$k_7$" and replace with -- $K_7$ --.
Line 34, delete "$k_8$" and replace with -- $K_8$ --.

UNITED STATES PATENT AND TRADEMARK OFFICE
CERTIFICATE OF CORRECTION

PATENT NO. : 6,424,552 B1
DATED : July 23, 2002
INVENTOR(S) : Boris Solomon Jacobson It is certified that error appears in the above-identified patent and that said Letters Patent is hereby corrected as shown below:

Column 6,
Line 19, delete "VOUT" and replace with -- $V_{out}$ --.
Line 32, delete "off-the shelf" and replace with -- off-the-shelf --.
Line 50, delete "(Ka=" and replace with -- ($K_a$ or KA --.
Line 62, delete "110b; and 110c;" and replace with -- 110b'; and 110c'; --.
Line 63, delete "being and connected" and replace with -- being connected --.
Line 66, delete "112c" and replace with -- 112c' --.
Line 67, delete "114c" and replace with -- 114c' --.

Column 7,
Line 1, delete "116c" and replace with -- 116c' --.
Line 1, delete "118c" and replace with -- 118c' --.
Line 3, delete "110b; and 110c;" and replace with -- 110b'; and 110c'; --.
Line 5, delete "112c" and replace with -- 112c' --.
Line 5, delete "114c" and replace with -- 114c' --.
Line 7, delete "116c" and replace with -- 116c' --.
Line 7, delete "118c" and replace with -- 118c' --.
Line 10, delete "110b; and 110c" and replace with -- 110b'; and 110c' --.
Line 22, delete "is a less than" and replace with -- is less than --.
Line 32, delete "108a." and replace with -- 108a'. --.
Line 54, delete "120g through 120l" and replace with -- 120g' through 120l' --.

Column 8,
Line 61, delete "winding" and replace with -- windings --.
Line 67, delete "winging" and replace with -- winding --.

Column 9,
Line 22, delete "are equal" and replace with -- being equal --.
Line 26, delete "sets M sets" and replace with -- M sets --.
Line 28, delete "sets M sets" and replace with -- M sets --.
Line 42, delete "winding" and replace with -- windings --.

UNITED STATES PATENT AND TRADEMARK OFFICE
CERTIFICATE OF CORRECTION

PATENT NO. : 6,424,552 B1
DATED : July 23, 2002
INVENTOR(S) : Boris Solomon Jacobson It is certified that error appears in the above-identified patent and that said Letters Patent is hereby corrected as shown below:

Column 10,
Line 23, delete "winding" and replace with -- windings --.
Line 60, delete "windings" and replace with -- windings; and --.

Signed and Sealed this

Twenty-eighth Day of January, 2003

JAMES E. ROGAN
*Director of the United States Patent and Trademark Office*